United States Patent
Chung et al.

(10) Patent No.: US 9,005,754 B2
(45) Date of Patent: *Apr. 14, 2015

(54) UNDRAWN POLYETHYLENE TEREPHTHALATE (PET) FIBER, DRAWN PET FIBER, AND TIRE-CORD COMPRISING THE SAME

(75) Inventors: Il Chung, Gumi-si (KR); Ok-Hwa Jeon, Gyeongsan-si (KR); Gi-Woong Kim, Daegu (KR)

(73) Assignee: Kolon Industries, Inc., Kwacheon (KR)

( * ) Notice: Subject to any disclaimer, the term of this patent is extended or adjusted under 35 U.S.C. 154(b) by 435 days.

This patent is subject to a terminal disclaimer.

(21) Appl. No.: 12/935,523

(22) PCT Filed: Mar. 31, 2009

(86) PCT No.: PCT/KR2009/001648
§ 371 (c)(1),
(2), (4) Date: Sep. 29, 2010

(87) PCT Pub. No.: WO2009/123414
PCT Pub. Date: Oct. 8, 2009

(65) Prior Publication Data
US 2011/0024016 A1    Feb. 3, 2011

Related U.S. Application Data

(60) Provisional application No. 61/047,508, filed on Apr. 24, 2008, provisional application No. 61/083,916, filed on Jul. 26, 2008.

(30) Foreign Application Priority Data

| Mar. 31, 2008 | (KR) | 10-2008-0029557 |
| Jul. 22, 2008 | (KR) | 10-2008-0071075 |
| Mar. 31, 2009 | (KR) | 10-2009-0027233 |
| Mar. 31, 2009 | (KR) | 10-2009-0027237 |

(51) Int. Cl.
*D02G 3/00* (2006.01)
*D01D 5/12* (2006.01)
(Continued)

(52) U.S. Cl.
CPC .............. *D01D 5/098* (2013.01); *B60C 9/0042* (2013.04); *D01F 6/62* (2013.01); *D02G 3/48* (2013.01); *D10B 2331/04* (2013.01)

(58) Field of Classification Search
CPC ........ B60C 9/0042; D01D 5/098; D01F 6/62; D02G 3/48; D10B 2331/04
USPC ........................................ 428/364, 902, 375
See application file for complete search history.

(56) References Cited

U.S. PATENT DOCUMENTS 3,946,100 A * 3/1976 Davis et al. .............. 264/211.15
4,101,525 A * 7/1978 Davis et al. ................ 528/308.2
(Continued)

FOREIGN PATENT DOCUMENTS

CN    1035444 A    9/1989
CN    1043164 A    6/1990
(Continued)

OTHER PUBLICATIONS

Korean Patent Office, Korean Notice of Allowance issued in corresponding KR Application No. 10-2009-0027233, dated Jan. 24, 2013.
(Continued)

Primary Examiner — Jeremy R Pierce
(74) Attorney, Agent, or Firm — Sughrue Mion, PLLC

(57) ABSTRACT

The present invention relates to an undrawn PET fiber and a drawn PET fiber those can provide a cap ply cord and the like showing more improved modulus and good dimensional stability, and a tire cord including the same. The undrawn PET fiber may be a fiber of which the crystallinity is 25% or more, the birefringence index is 0.085 to 0.11, the amorphous orientation factor (AOF) is 0.15 or less, and the melting temperature (Tm) is 258° C. or more.

24 Claims, 2 Drawing Sheets

(51) Int. Cl.
   *B29C 47/88* (2006.01)
   *D02J 1/22* (2006.01)
   *D01D 5/098* (2006.01)
   *B60C 9/00* (2006.01)
   *D01F 6/62* (2006.01)
   *D02G 3/48* (2006.01)

(56) References Cited

U.S. PATENT DOCUMENTS

| | | | |
|---|---|---|---|
| 5,067,538 A | 11/1991 | Nelson et al. | |
| 5,558,935 A * | 9/1996 | Tanaka et al. | 428/364 |
| 5,894,875 A * | 4/1999 | Masaki et al. | 152/527 |
| 6,764,623 B2 * | 7/2004 | Kim et al. | 264/103 |
| 7,108,818 B2 | 9/2006 | Nelson et al. | |
| 2001/0039988 A1 * | 11/2001 | Kim et al. | 428/364 |
| 2002/0187344 A1 | 12/2002 | Nelson et al. | |
| 2005/0196610 A1 | 9/2005 | Park et al. | |
| 2005/0196611 A1 | 9/2005 | Park et al. | |

FOREIGN PATENT DOCUMENTS

| | | | |
|---|---|---|---|
| CN | 1044833 A | 8/1990 | |
| CN | 1417391 A | 5/2003 | |
| CN | 1464078 A | 12/2003 | |
| CN | 100360724 C | 1/2008 | |
| JP | 06-248521 A | 9/1994 | |
| JP | 2000-248425 A | 9/2000 | |
| JP | 2005042232 A | 2/2005 | |
| KR | 10-0235758 B1 | 1/2000 | |
| KR | 10-0456340 B1 | 11/2004 | |
| KR | 100571214 B1 | 4/2006 | |
| KR | 10-2008-0112160 A | 12/2008 | |
| KR | 10-0987494 B1 | 10/2010 | |
| WO | 93/14252 A1 | 7/1993 | |
| WO | 2008/156333 A1 | 12/2008 | |
| WO | WO 2008156334 A1 * | 12/2008 | D02G 3/48 |

OTHER PUBLICATIONS

Korean Patent Office, Korean Notice of Allowance issued in corresponding KR Application No. 10-2009-0027237, dated Jan. 24, 2013.

* cited by examiner

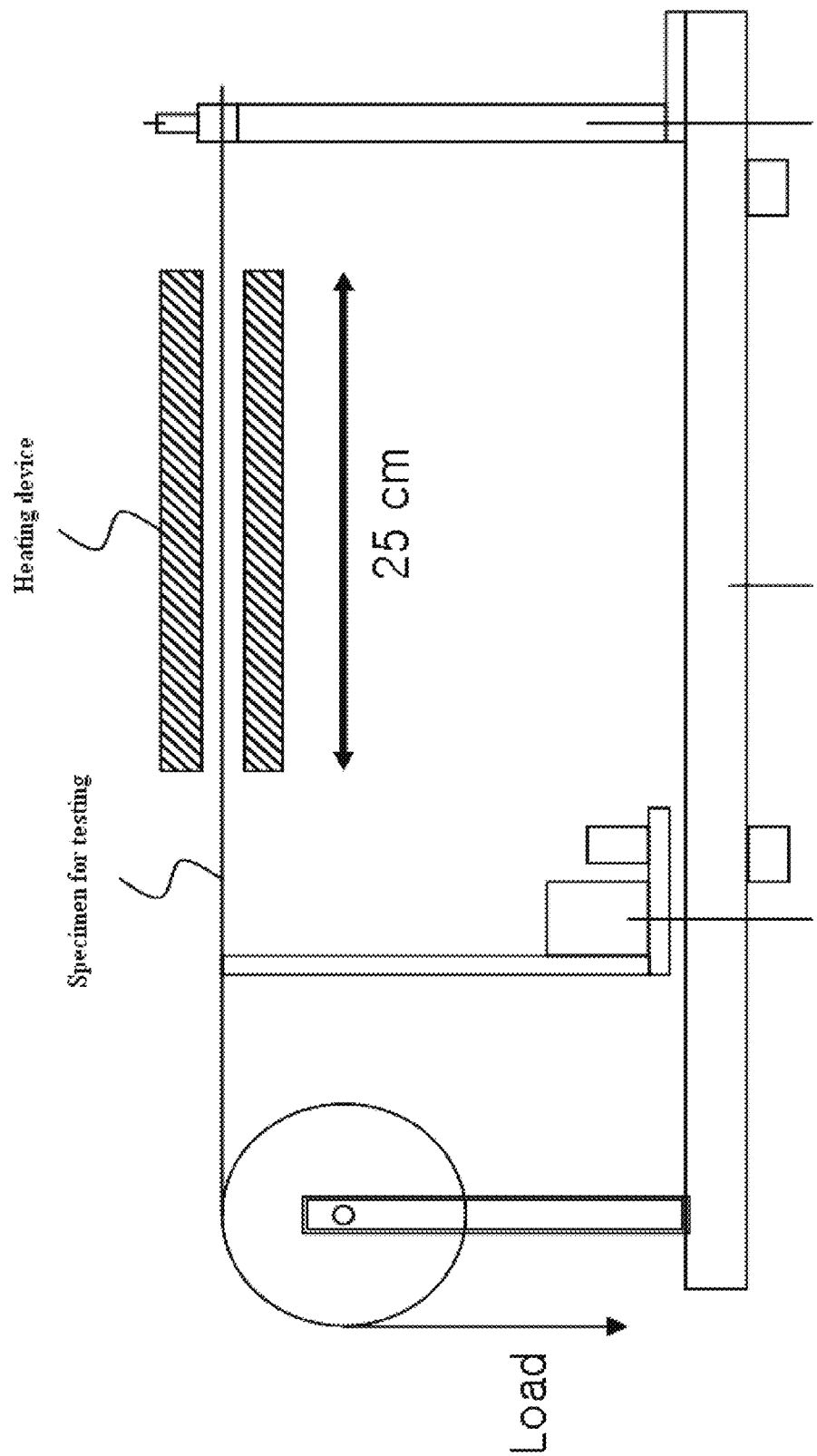

UNDRAWN POLYETHYLENE TEREPHTHALATE (PET) FIBER, DRAWN PET FIBER, AND TIRE-CORD COMPRISING THE SAME

CROSS REFERENCE TO RELATED APPLICATIONS

This application is a National Stage of International Application No. PCT/KR2009/001648 filed on Mar. 31, 2009, which claims priority from Korean Patent Application Nos. 10-2008-0029557 filed on Mar. 31, 2008, 10-2008-0071075, filed Jul. 22, 2008, 10-2009-0027233 and 10-2009-0027237 filed Mar. 31, 2009, U.S. Provisional Patent Application Nos. 61/047,508, filed Apr. 24, 2008 and 61/083,916, filed Jul. 26, 2008 the contents of all of which are incorporated herein by reference in their entirety.

BACKGROUND OF THE INVENTION (a) Field of the Invention

The present invention relates to an undrawn polyethylene terephthalate (PET) fiber, a drawn PET fiber, and a tire cord including the same. More particularly, the present invention relates to an undrawn PET fiber and a drawn PET fiber those can provide a cap ply cord and the like showing more improved modulus and good dimensional stability according to this, and a tire cord including the same.

(b) Description of the Related Art

A tire is a complex body of fiber/steel/rubber, and generally has a structure as illustrated in FIG. 1. That is, the steel and the fiber cords take a role of reinforcing the rubber and form a basic skeletal structure in the tire. It is, so to speak, like the role of a bone in a human body.

As a reinforcement of the tire, the performances such as fatigue resistance, shear strength, durability, repelling elasticity, adhesion to a rubber, and the like are required to the cord. Therefore, various cords made of suitable materials are used according to the performances required to the tire.

Recently, rayon, nylon, polyester, steel, aramid, and the like are generally used as the materials for the cord, and the rayon and the polyester are used for a body ply (or a carcass) (6 in FIG. 1), the nylon is mainly used for a cap ply (4 in FIG. 1), and the steel and the aramid are mainly used for a tire-belt part (5 in FIG. 1).

The structure and the characteristics of the tire represented in FIG. 1 are briefly described hereinafter.

Tread 1: A part contacting to the road surface; this part must provide a friction force necessary for braking and driving, be good in abrasion resistance, and also be able to stand against an external shock, and its heat generation must be small.

Body ply (or Carcass) 6: A cord layer inside the tire; this part must support a load and stand against a shock, and its fatigue resistance against bending and stretching movement during a driving must be good.

Belt 5: This part is located between the body plies and mostly composed of steel wire, and it lessens the external shock and also makes the ground contacting surface of the tread wide and the driving stability good.

Side wall 3: A rubber layer between the lower part of the shoulder 2 and the bead 9; it takes a role of protecting the internal body ply 6.

Bead 9: A square or hexagonal wire bundle, wherein a rubber is coated on the steel wires; it takes a role of fitting and fixing the tire to a rim.

Inner liner 7: A part located inside the tire instead of a tube; it makes a pneumatic tire possible by preventing air leakage.

Cap ply 4: A special cord fabric located on the belt of a radial tire for some passenger cars; it minimizes the movement of the belt during driving.

Apex 8: A triangular rubber packing material used for minimizing the dispersion of the bead, protecting the bead by relieving the external shock, and preventing an air inflow during shaping.

Recently, developments for tires suitable for high speed driving are required as the passenger cars gentrify, and accordingly the stability during high speed driving and high durability of the tire are recognized as greatly important characteristics. Furthermore, the performance of the materials for the cap ply cord importantly comes to the force before everything else for satisfying the characteristics.

The steel belt inside the tire is generally arranged in the oblique direction, the steel belt, however, tends to move toward the circumferential direction during high speed driving, and there are some problems that the sharp ends of the steel belt may cause separation between the layers of the belt and shape deformation of the tire by cutting the rubber or generating cracks. The cap ply prevents the separation between the layers and the deformation of the shape of the tire and takes a role of improving the high speed durability and the driving stability by restraining the movement of the steel belt.

A nylon 66 cord is mainly used for general cap ply cord. The nylon 66 cord can show the effect of restraining the movement of steel belt by generating high shrinkage force at the circumstance of high temperature corresponding to the internal circumstance of the tire during high speed driving, and wrapping the belt. However, it has disadvantages in that the nylon 66 cord may be deformed partially by the load of the tire and the car because it has low modulus and glass-transition temperature at high temperature and low dimensional stability according to this and it may clatter during driving due to the same.

To resolve the disadvantages, a PET cord having relatively high modulus and dimensional stability have been used as the cap ply cord, however, it is difficult to restrain the movement of the steel belt effectively because of its low shrinkage force, and it is also difficult to be applied to the cap ply cord. In addition, the shape of the PET cord may easily be deformed and the deformed PET cord results in a tire deformation when the load given to the cord is changed by the change of the driving speed of the car, because the cord composed of the general PET fiber does not have sufficient dimensional stability as well.

Furthermore, in case of the cord composed of high modulus low shrinkage (HMLS) PET fiber that is widely used as a fiber or an industrial fiber, it is possible to show high shrinkage force in comparison with the cord composed of the general PET fiber, however, the disadvantages like in the nylon 66 cord described above may still be occurred because the dimensional stability decreases as the modulus is decreased in this case.

SUMMARY OF THE INVENTION

An aspect of the present invention is to provide an undrawn PET fiber and a drawn PET fiber those can provide a cap ply cord and the like showing more improved modulus and good dimensional stability.

Another aspect of the present invention is to provide a method of preparing the drawn PET fiber.

Still another aspect of the present invention is to provide a PET tire cord that shows superior dimensional stability and is preferably applicable to the cap ply cord and the like.

Still another aspect of the present invention is to provide a tire including the PET tire cord.

The present invention provides an undrawn PET fiber, of which the crystallinity is 25% or more, the birefringence index is 0.085 to 0.11, the amorphous orientation factor (AOF) is 0.15 or less, and the melting temperature (Tm) is 258° C. or more.

The present invention also provides a drawn PET fiber including 90 mol % or more of PET, of which the crystallinity is 40% or more, and the birefringence index is 0.12 to 0.16.

The present invention also provides a drawn PET fiber including 90 mol % or more of PET, of which the cross-linking density is 3.0E+22 to 8.0E+22 ea/cm$^3$ after heat-treating the same at 230° C. for 1 minute in a taut state under the initial load of 0.02 g/d.

The present invention also provides a method of preparing a drawn PET fiber, including the steps of melt-spinning a polymer including 90 mol % or more of PET so as to prepare an undrawn PET fiber having the crystallinity of 25% or more and the amorphous orientation factor (AOF) of 0.15 or less; and drawing the undrawn PET fiber with the drawing ratio of 1.0 to 1.55 so as to prepare the drawn PET fiber.

The present invention also provides a PET tire cord including the drawn PET fiber.

The present invention also provides a pneumatic tire including the PET tire cord.

BRIEF DESCRIPTION OF THE DRAWINGS

FIG. 2 is a schematic drawing of a shrinkage behavior tester used for measuring shrinkage rate or shrinkage force of tire cord.

DETAILED DESCRIPTION OF THE PREFERRED EMBODIMENTS

Figure 1:
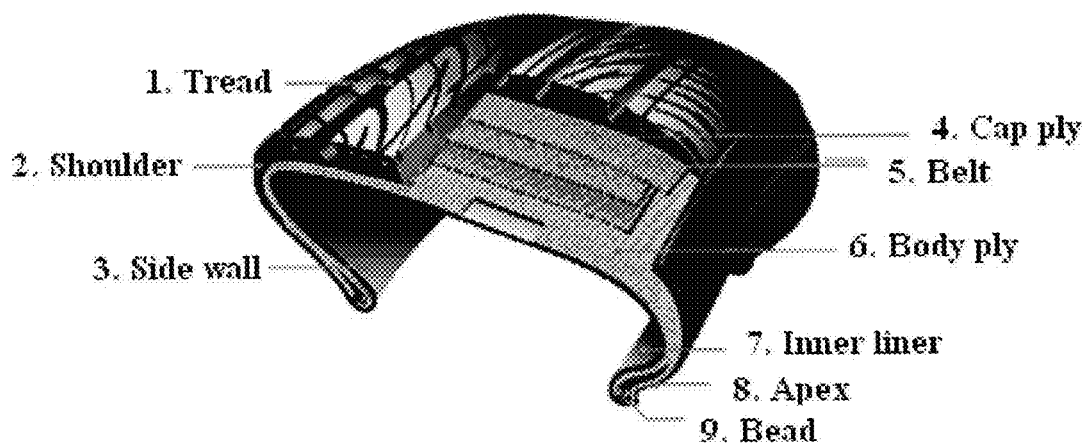
FIG. 1 is a partial cut-away perspective view illustrating a structure of a general tire.

Hereinafter, the undrawn PET fiber, the drawn PET fiber, the tire cord, the method of preparing the same, and the tire including the same are explained in more detail according to the specific embodiments of the invention. However, since the embodiments are provided as examples of the invention, the scope of the present invention is not limited to or by them, and it is obvious to a person skilled in the related art that various modifications of the embodiments are possible within the scope of the invention.

In addition, the term 'include' or 'comprise' means that include any component (or any element) without particular limitations and it cannot be interpreted as it excludes the addition of the other components (or elements), unless otherwise mentioned in the present entire disclosure.

The PET tire cord may be prepared into a dip cord type by twisting the drawn PET fiber and dipping the same into an adhesive, after melt-spinning a PET polymer so as to prepare an undrawn fiber and drawing the undrawn fiber so as to prepare the drawn PET fiber.

Therefore, the properties of the undrawn fiber prepared by melt-spinning the PET and the drawn fiber prepared by drawing the same are directly or indirectly reflected to the properties of the tire cord.

According to experimental results of the present inventors, it is revealed that the PET tire cord that shows more improved modulus and dimensional stability and can preferably be used as a cap ply cord can be obtained by preparing the tire cord from the undrawn PET fiber and/or the drawn PET fiber having specific properties.

Therefore, the undrawn PET fiber having specific properties is provided according to one embodiment of the invention. The undrawn PET fiber may have the crystallinity of 25% or more, the birefringence index of 0.085 to 0.11, the amorphous orientation factor (AOF) of 0.15 or less, and the melting temperature (Tm) of 258° C. or more.

Various additives may be added to the PET polymer composing the undrawn fiber in the step of preparing the same, and it is preferable that the undrawn fiber includes 90 mol % or more of PET polymer in order to show the properties of PET suitable for the tire cord. Hereinafter, therefore, the term "PET" means what includes 90 mol % or more of PET polymer unless otherwise explained.

The undrawn PET fiber according to one embodiment of the invention is prepared under the controlled melt-spinning conditions described below, and becomes to show high crystallinity of 25% or more and low AOF of 0.15 or less.

The PET polymer composing the undrawn fiber, basically, has partially crystallized structure, and is composed of crystalline regions and amorphous regions. In particular, the undrawn PET fiber obtained under the controlled melt-spinning conditions has higher crystallinity than that of formerly known undrawn PET fibers (commonly, crystallized less than 7%) because of the oriented crystallization phenomenon, and it shows high crystallinity of 25% or more, and preferably of 25 to 40%. The drawn PET fiber and the tire cord prepared from the undrawn PET fiber can show high shrinkage force and modulus due to such high crystallinity.

At the same time, the undrawn PET fiber shows the AOF of 0.15 or less, and preferably of 0.08 to 0.15, which is much lower than that of formerly known undrawn PET fibers. The AOF means that the degree of orientation of the chains included in the amorphous region of the undrawn fiber, and it has low value as the entanglement of the chains of the amorphous region increases. Generally, the drawn fiber and the tire cord prepared from the undrawn fiber having the low AOF value show low shrinkage force and low shrinkage rate, because the degree of disorder increases as the AOF decreases and the chains of the amorphous region becomes not a strained structure but a relaxed structure. However, the undrawn PET fiber obtained under the controlled melt-spinning conditions includes more cross-linking bonds per a unit volume, because the molecular chains constituting the undrawn PET fiber slip during the spinning process and form a fine network structure. On this account, the undrawn PET fiber may become the structure of which the chains of the amorphous region are strained in spite of the largely lower AOF value, and thus it shows developed crystalline structure and superior orientation characteristics due to this.

Therefore, it becomes possible to prepare the drawn PET fiber and the tire cord having high shrinkage force as well as low shrinkage rate at the same time by using the undrawn PET fiber having such high crystallinity and low AOF. Therefore, the PET tire cord showing high shrinkage force while having more improved modulus and superior dimensional stability can be obtained by using the undrawn PET fiber. Such tire cord can effectively restrain the movement of the steel belt in the tire while showing superior dimensional stability, and thus it can preferably be used to the cap ply cord and the like.

In addition, the undrawn PET fiber according to one embodiment of the invention may show the crystallinity of 25% or more, and preferably of 25 to 40%, and may have the birefringence index of 0.085 to 0.1, the AOF of 0.15 or less, and the melting temperature of 258° C. or more. As described above, it is possible to provide the drawn fiber and the tire cord those have high modulus and shrinkage force and can be preferably used to the cap ply by using the undrawn fiber having such high crystallinity and superior orientation characteristics of the molecules.

Furthermore, it is preferable that the specific heat of crystal (ΔH) of the undrawn PET fiber is 42 to 50 J/g, and it is also preferable that the (010) interplanar spacing of the fine crystal calculated from the X-ray diffraction (XRD) peak is 51 to 57 Å, the (110) interplanar spacing is 45 to 50 Å, and the (100) interplanar spacing is 42 to 50 Å. The undrawn PET fiber satisfying such characteristics can have higher crystallinity and be more superior in the orientation characteristics of the molecules, and thus the drawn PET fiber that is more preferably applicable to the cap ply cord and the like, and the tire cord can be obtained from the undrawn fiber.

In addition, the drawn PET fiber that can be prepared from the undrawn PET fiber is provided according to another embodiment of the invention. According to one example of another embodiment, the drawn PET fiber may include 90 mol % or more of PET, and the crystallinity thereof may be 40% or more, and preferably 40 to 50%, and the birefringence index may be 0.12 to 0.16. The drawn PET fiber and the tire cord prepared therefrom can have high modulus and shrinkage force, and thus they are preferably applicable to the cap ply cord and the like.

That is, the drawn PET fiber according to one example can be prepared by using the undrawn PET fiber according to one embodiment of the invention having high crystallinity and superior orientation characteristics of the molecules in the amorphous region, and accordingly the crystalline structure is developed therein and the crystallinity thereof may be 40% or more, and preferably 40 to 50%. By this, the drawn PET fiber and the tire cord obtained therefrom can have high modulus and shrinkage force. However, for example, when the crystallinity is excessively increased over 60%, the strength thereof is excessively increased and the processability and the flexibility is decreased. Also, it may be difficult to use the tire cord for a long time because the fatigue property of the tire cord obtained therefrom is largely decreased by the excessive increase of the stiffness.

Furthermore, the amorphous orientation factor (AOF) of the drawn PET fiber may be 0.35 or less, and preferably 0.01 to 0.2. As described above, the AOF represents the degree of orientation of the amorphous chains. Generally, there may be a disadvantage of low shrinkage force of the drawn PET fiber because the molecular chains in the amorphous region generally become a relaxed structure, as the AOF is low. However, the molecular chains of the drawn PET fiber according to one example form a fine network structure during the process of forming the undrawn fiber, and the chains in the amorphous region may become a strained structure even though the AOF decreases largely. Therefore, the drawn PET fiber may show superior shrinkage force while having high modulus and low shrinkage rate. Therefore, the tire cord prepared from the same can preferably be used to the cap ply cord and the like.

Furthermore, it is preferable that the drawn PET fiber according to one example described above has the (010) interplanar spacing of the fine crystal calculated from the XRD peak of 48 to 60 Å, the (110) interplanar spacing of 42 to 50 Å, and the (100) interplanar spacing of 38 to 50 Å. By this, the crystallinity of the drawn PET fiber can be higher and the orientation characteristics thereof can become more superior, and thus the tire cord having superior properties such as higher modulus and shrinkage force is obtainable.

Meanwhile, according to another example of another embodiment of the invention, the drawn PET fiber that is obtainable from the undrawn PET fiber according to one embodiment of the invention may include 90 mol % or more of PET, and may have the cross-linking density of 3.0E+22 to 8.0E+22 ea/cm$^3$, and preferably of 5.0E+22 to 8.0E+22 ea/cm$^3$, after heat-treating the same at 230° C. for 1 minute in a taut state under the initial load of 0.02 g/d. More preferably, the drawn PET fiber may have the cross-linking density of 2.0E+22 to 6.0E+22 ea/cm$^3$, and preferably of 2.5E+22 to 6.0E+22 ea/cm$^3$, before heat-treating the same at 230° C. as described above.

The drawn PET fiber according to another example forms many more cross-link bonds in its amorphous region, and has higher cross-linking density per a unit volume than the drawn fibers composed of general PET fiber or HMLS fiber. As such drawn PET fiber includes many cross-linking bonds per a unit volume, the chains in the amorphous region is highly entangled and has a strained structure while the degree of orientation is low. Therefore, the drawn PET fiber has very developed crystalline structure and superior orientation characteristics, and it is possible to show high shrinkage force while having high modulus and low shrinkage rate. Therefore, the tire cord prepared from the same can preferably be used to the cap ply cord and the like.

The cross-linking density of the drawn PET fiber may be calculated by the following Mathematical Formula 1:

$$N = \sigma/kT(\lambda^2 - 1/\lambda) \quad \text{[Mathematical Formula 1]}$$

In the mathematical formula, N represents a number of cross-linking bond per a unit volume, namely, the cross-linking density, λ, represents an expansion ratio defined as 1/(1−shrinkage rate of the drawn PET fiber), k represents Boltzmann constant, T represents an absolute temperature, and σ represents a shrinkage force per a unit area of the drawn PET fiber.

In addition, the drawn PET fiber according to another embodiment of the invention described above (that is, the drawn fiber according to one example or another example of another embodiment) may be prepared by the method of melt-spinning the PET so as to prepare the undrawn fiber, and drawing the undrawn fiber. Furthermore, the drawn PET fiber having the properties mentioned above can be prepared under the specific conditions or the specific proceeding methods of each step those are directly or indirectly reflected to the properties of the drawn PET fiber as described above.

Particularly, it is revealed that the drawn PET fiber according to another embodiment of the invention described above can be prepared by obtaining the undrawn PET fiber having the crystallinity of 25% or more and the AOF of 0.15 or less by controlling the melt-spinning conditions of the PET, and using the same. More preferably, the drawn PET fiber may be prepared from the undrawn PET fiber according to one embodiment of the invention, that is, the undrawn PET fiber having the crystallinity of 25% or more, the birefringence index of 0.085 to 0.11, the AOF of 0.15 or less, and the melting temperature (Tm) of 258° C. or more. As described above, it is possible to obtain the drawn PET fiber according to another embodiment of the invention showing very developed crystalline structure and superior orientation characteristics, or high cross-linking density, by using the undrawn PET fiber having high crystallinity and low AOF. The drawn PET fiber and the tire cord prepared from the same show high modulus and shrinkage force at the same time and are preferably applicable to the cap ply cord and the like.

Hereinafter, the preparing method of the drawn PET fiber is explained step-by-step more in detail, as follows.

In the preparing method of the drawn PET fiber, firstly, the undrawn PET fiber having high crystallinity and low AOF described above, preferably the undrawn PET fiber according to one embodiment of the invention, is prepared by melt-spinning the PET.

At this time, the melt-spinning process may be carried out with a higher spinning stress in order to obtain the undrawn PET fiber satisfying high crystallinity and low AOF. For example, the melt-spinning process may be carried out with the spinning stress of 0.85 g/d or more, and preferably of 0.85 to 1.2 g/d. Also, for example, the melt-spinning speed of the PET may be controlled to be 3800 to 5000 m/min, and preferably 4000 to 4500 m/min in order to obtain such high spinning stress.

As results of experiments, it is revealed that according as the melt-spinning process of the PET is carried out with the high spinning stress and selectively high spinning speed, the oriented crystallization phenomenon occurs and the crystallinity of the PET increases. As a result, the undrawn PET fiber satisfying the crystallinity and the AOF described above can be obtained as the molecular chains constituting the PET slip during the spinning process and form a fine network structure. However, it is realistically not easy to control the spinning speed to be over 5000 m/min and it is also difficult to carry out the cooling process because of the excessive spinning speed.

Furthermore, the chips having an intrinsic viscosity of 0.8 to 1.3 dl/g and including 90 mol % or more of PET may be used in the melt-spinning as the PET in the preparing process of the undrawn PET fiber.

It is preferable that the intrinsic viscosity is 0.8 dl/g or more in order to carry out the spinning step suitably with the conditions of higher spinning speed and spinning stress in the preparing process of the undrawn PET fiber. Also, it is preferable that the intrinsic viscosity is 1.3 dl/g or less in order to prevent the scission of the molecular chains due to the increase of the melting temperature of the chips and the increase of the pressure due to the extrusion amount in the spinning pack.

Furthermore, it is preferable that the chips are spun through the spinnerets designed for making linear density of a monofilament to be 2.0 to 4.0 denier, and preferably 2.5 to 3.0 denier. It is preferable that the linear density of the monofilament is 2.0 denier or more in order to lessen the possibility of the fiber scission during the spinning and the fiber scission due to the interference of the fibers during the cooling, and it is also preferable that the linear density of the monofilament is 4.0 denier or less in order to give the sufficient spinning stress by raising the spinning draft.

Further, the undrawn PET fiber may be prepared by adding the cooling process after the melt-spinning of the PET. Such cooling process may be preferably carried out according to the method of providing a cooling air of 15 to 60° C., and the cooling air flow may be preferably controlled to be 0.4 to 1.5 m/s in each temperature condition of the cooling air. With this, it is possible to prepare the undrawn PET fiber showing several properties according to one embodiment of the invention more easily.

On the other hand, the drawn fiber is prepared by drawing the undrawn fiber after preparing the undrawn PET fiber satisfying the crystallinity and the AOF described above through the spinning step. At this time, the drawing process may be carried out under the condition of a drawing ratio of 0.1 to 1.55. In the undrawn PET, the crystalline region is developed, and the chains of the amorphous region also have low degree of orientation and form the fine network. Therefore, the scission of the fibers or hairiness may occur in the drawn fiber when the drawing process is carried out with the drawing ratio of over 1.55, and thus the drawn PET fiber prepared by the method is also hard to show the preferable properties. Furthermore, the strength of the drawn PET fiber and the tire cord prepared therefrom may be partially lowered when the drawing process is carried out with a relatively low drawing ratio. However, it is possible to prepare the PET tire cord having the strength of 6 g/d or more, which is suitable to be applied for the cap ply cord and the like, under the drawing ratio of 1.0 or more, and thus the drawing process may preferably be carried out with the drawing ratio of 1.0 to 1.55.

Furthermore, the undrawn fiber may be heat-treated at the temperature of about 160 to 240° C. in the drawing process, and preferably at the temperature of 160 to 180° C. for adequate progress of the drawing process.

The drawn PET fiber prepared by the method described above can show the crystallinity, the birefringence index, the cross-linking density, and so on according to another embodiment of the invention, and it can show high shrinkage force and modulus at the same time by this. Therefore, the drawn PET fiber can be applied to the tire cord and preferably be used to the cap ply cord and the like.

Hereinafter, the PET tire cord including the drawn PET fiber described above is provided according to still another embodiment of the invention.

Such PET tire cord may have the L/S value defined as the following Calculation Formula 1 of 70 g/d to 150 g/d and can show superior dimensional stability:

$$L/S = LASE/\text{Shrinkage rate}(\%) \quad \text{[Calculation Formula 1]}$$

In the calculation formula, LASE is a value defined as Load At Specific Elongation, and it is particularly defined as the load when the elongation is 3% at 100° C. in the calculation formula above. It is due to that the initial modulus has relatively large importance in the case of the PET tire cord.

In order to satisfy such L/S value, the LASE of the PET tire cord defined as the load at 3% elongation may be 1.7 to 3.0 g/d when testing the tensile property with the initial load of 0.05 g/d at the temperature of 100° C.

The L/S value in the Calculation Formula 1 represents how the tire cord maintains its dimension stably against external heat or force as a dimensional stability index. Namely, the tire cord is hardly deformed by the external heat or force and can maintain its dimension stably, as the L/S value is high. The PET tire cord according to still another embodiment has very high L/S value, for example, L/S value of 70 g/d to 150 g/d, because it is prepared from the drawn fiber having high shrinkage force and modulus described above. Thus, the PET tire cord is hardly deformed by the external heat or force and can effectively restrain the movement of the steel belt by wrapping the steel belt in the tire. Furthermore, the PET tire cord can effectively inhibit the partial deformation due to the load of the tire and the car, and the noise due to the deformation.

On the other hand, the shape of the PET tire cord according to still another embodiment of the invention described above is not specifically limited, and thus the shape may be equal to conventional cap ply cords. More particularly, such PET tire cord may have a shape of a dipped cord, of which the total linear density per a cord is 1000 to 5000 denier, the number of ply is 1 to 3, and the twisting level is 200 to 500 TPM (twist per meter), according to the shape of conventional cap ply cord.

Furthermore, the PET tire cord may show the strength of 5 to 8 g/d, the elongation (Elongation at the load of 4.5 kgf) of 1.5 to 5.0%, and preferably of 2.0 to 5.0%, the elongation at break of 10 to 25%, and the shrinkage rate (177° C., 30 g, 2 min) of 0.5 to 5.0%, and preferably of 2.0 to 5.0%. The tire cord is preferably applicable to the cap ply cord, according as it shows the properties, such as the strength, the elongation, and the like, of the above range.

Furthermore, the PET tire cord is applicable to the pneumatic tire as the cap ply cord. The cap ply cord has superior dimensional stability and its external shape is hardly deformed, and thus the tire in which the PET tire cord is included is also not deformed easily. Therefore, the tire can improve the controllability or the riding comport of the car. Furthermore, the tire in which the cap ply cord is included can show stable high speed driving performance because the PET tire cord has several properties able to restrain the movement of the steel belt and suitable for the cap ply cord.

The PET tire cord according to still another embodiment of the invention described above is mainly explained by supposing that the cord is used as the cap ply cord, however, the use of the PET tire cord is not limited to this and it is of course that the cord may be used for the other uses such as a body ply cord and the like.

On the other hand, the tire cord according to still another embodiment of the invention may be prepared by the method of melt-spinning the PET so as to prepare the undrawn PET fiber, drawing the undrawn PET fiber so as to prepare the drawn PET fiber, twisting the drawn PET fibers and dipping the same in an adhesive so as to prepare a dipped cord. The specific conditions or the specific proceeding methods of each step may directly or indirectly be reflected to the properties of the tire cord prepared finally, and the PET tire cord having above mentioned properties can be prepared.

For example, the PET tire cord according to still another embodiment of the invention can be provided by melt-spinning the PET with the condition of higher spinning stress and selectively high spinning speed so as to prepare the undrawn PET fiber having the crystallinity of 25% or more and the AOF of 0.15 or less, preferably the undrawn PET fiber according to one embodiment of the invention, and preparing the drawn PET fiber and the tire cord by using the same. Therefore, the PET tire cord according to still another embodiment of the invention may be prepared by using the drawn PET fiber according to another embodiment of the invention, for example, the drawn fiber obtained from the undrawn PET fiber having high crystallinity and low AOF.

That is, it is possible to prepare the drawn PET fiber showing high shrinkage force and low shrinkage rate together because the undrawn PET fiber has high crystallinity and low AOF, and thus the PET tire cord having superior dimensional stability suitable for the cap ply cord and the like can be prepared by using the same.

Furthermore, the process of twisting the drawn PET fiber and the process of dipping the same in an adhesive, in the preparing process of the PET tire cord, may follow common process conditions and methods of preparing a PET tire cord.

EXAMPLES

Hereinafter, the technical features and the operations of the invention are described in further detail through preferable examples. However, the following examples are only for the understanding of the invention and the scope of the invention is not limited to or by them.

Examples 1 to 9

Preparation of Undrawn PET Fibers

The undrawn PET fibers of Examples 1 to 9 were prepared by the method of melt-spinning the PET polymer having specific intrinsic viscosity (dl/g), and cooling the same. At this time, the intrinsic viscosity of the PET polymer and the conditions of spinning speed and spinning stress of the melt-spinning process were as disclosed in the following Table 1, and the other conditions followed conventional conditions for preparing an undrawn PET fiber.

TABLE 1

| Examples | 1 | 2 | 3 | 4 | 5 | 6 | 7 | 8 | 9 |
| --- | --- | --- | --- | --- | --- | --- | --- | --- | --- |
| Intrinsic Viscosity (dl/g) | 0.85 | 1.05 | 1.05 | 1.05 | 1.05 | 1.20 | 0.9 | 1.2 | 1.05 |
| Spinning Speed (m/min) | 4200 | 3800 | 4000 | 4200 | 4500 | 4200 | 4500 | 4500 | 4800 |
| Spinning stress (g/d) | 0.93 | 0.86 | 0.92 | 1.03 | 1.15 | 1.08 | 0.98 | 1.23 | 1.19 |

The properties of the undrawn fibers prepared according to Examples 1 to 9 were measured by the following methods, and the measured results are listed in the following Table 2.

Crystallinity: the density was measured after preparing a density gradient tube by using $CCl_4$ and n-heptane, and the crystallinity was calculated from the density by using the following calculation formula:

$$PET \text{ Crystallinity}(\%) = Xc\ (\%) = \left(\frac{\rho - \rho_a}{\rho_c - \rho_a}\right) \times 100$$

wherein, $\rho_a$=1.336, and $\rho_c$=1.457 in case of the PET.

Birefringence index: the birefringence index was measured by using a polarization microscope.

Amorphous orientation factor (AOF): the AOF was calculated according to the following formula by using the birefringence index that is measured by using a polarization microscope and the crystal orientation factor (COF) that is measured by X-ray diffraction (XRD):

AOF=(birefringence index−crystallinity(%)*0.01*COF*0.275)/((1−crystallinity(%)*0.01)*0.22).

Dry heat shrinkage rate: the dry heat shrinkage rate was measured at the temperature of 180° C. and the initial load of 30 g for 2 minutes by using Testrite MK-V device (product name of a shrinkage behavior tester as illustrated in FIG. 2) of Testrite Co., England.

Strength, Strength at 1% elongation, LASE value, and Elongation at the load of 4.5 kgf: the strength, the strength at 1% elongation, the LASE value, and the Elongation at the load of 4.5 kgf were measured by using a universal testing machine, according to the testing method of ASTM D885.

Melting temperature and Specific heat of crystal (ΔH): the fibers (the undrawn fibers or the drawn fibers) were cut fine to be about 2 mg of samples, and the melting temperature and the specific heat of crystal were measured by using a DSC-7 device. At this time, the heating rate was 20° C./min.

Interplanar spacing: the interplanar spacing was measured by using the XRD method.

TABLE 2

| Examples | 1 | 2 | 3 | 4 | 5 | 6 | 7 | 8 | 9 |
|---|---|---|---|---|---|---|---|---|---|
| Crystallinity (%) | 32 | 28 | 30 | 33 | 36 | 33 | 34 | 36 | 38 |
| Birefringence Index | 0.090 | 0.088 | 0.090 | 0.091 | 0.093 | 0.092 | 0.089 | 0.094 | 0.097 |
| AOF | 0.074 | 0.120 | 0.093 | 0.054 | 0.009 | 0.061 | 0.015 | 0.012 | 0.002 |
| Strength (g/d) | 3.7 | 3.7 | 3.9 | 4.0 | 4.1 | 4.0 | 3.9 | 4.2 | 4.1 |
| Dry Heat Shrinkage Rate (%) | 5.2 | 6.2 | 5.7 | 5.5 | 4.6 | 5.9 | 4.5 | 5.4 | 4.3 |
| Strength at 1% Elongation (g/d) | 0.567 | 0.481 | 0.532 | 0.571 | 0.613 | 0.584 | 0.582 | 0.601 | 0.637 |
| Melting Temperature (° C.) | 262 | 258 | 263 | 262 | 270 | 261 | 269 | 270 | 271 |
| 010 Interplanar Spacing (Å) | 53 | 51 | 52 | 53 | 55 | 52 | 55 | 54 | 56 |
| 110 Interplanar Spacing (Å) | 48 | 45 | 46 | 47 | 48 | 45 | 47 | 46 | 49 |
| 100 Interplanar Spacing (Å) | 46 | 42 | 43 | 45 | 47 | 43 | 47 | 45 | 47 |

Comparative Examples 1 to 7

Preparation of Undrawn PET Fibers

The undrawn PET fibers of Comparative Examples 1 to 7 were prepared substantially according to the same method as in Examples 1 to 9, except the conditions disclosed in the following Table 3.

TABLE 3

| Comparative Examples | 1 | 2 | 3 | 4 | 5 | 6 | 7 |
|---|---|---|---|---|---|---|---|
| Intrinsic Viscosity (dl/g) | 0.75 | 1.05 | 1.05 | 1.05 | 1.05 | 1.30 | 1.05 |
| Spinning Speed (m/min) | 4200 | 3000 | 3500 | 3800 | 5000 | 4200 | 2700 |
| Spinning stress (g/d) | 0.81 | 0.52 | 0.63 | 0.72 | Unable to spin | Unable to spin | 0.45 |

The properties of the undrawn fibers prepared according to Comparative Examples 1 to 4, and 7, except Comparative Examples 5 and 6 those are unable to spin, are listed in the following Table 4.

TABLE 4

| | Comparative Examples | | | | |
|---|---|---|---|---|---|
| | 1 | 2 | 3 | 4 | 7 |
| Crystallinity (%) | 24 | 9 | 12 | 22 | 9 |
| Birefringence Index | 0.087 | 0.072 | 0.080 | 0.085 | 0.067 |
| AOF | 0.157 | 0.245 | 0.255 | 0.168 | 0.218 |
| Strength (g/d) | 3.2 | 2.8 | 3.0 | 3.2 | 2.7 |
| Dry Heat Shrinkage Rate (%) | 5.0 | 12.3 | 11.6 | 7.3 | 13.4 |
| Strength at 1% Elongation (g/d) | 0.423 | 0.152 | 0.165 | 0.337 | 0.150 |
| Melting Temperature (° C.) | 257 | 254 | 254 | 255 | 254 |
| 010 Interplanar Spacing (Å) | 50 | 46 | 47 | 48 | 45 |
| 110 Interplanar Spacing (Å) | 43 | 41 | 42 | 42 | 40 |
| 100 Interplanar Spacing (Å) | 42 | 32 | 36 | 38 | 32 |

As shown in Tables 2 and 4, it is recognized that the undrawn fibers of Examples 1 to 9 prepared under high spinning stress and spinning speed have high crystallinity and low AOF, and show developed crystalline structure and superior orientation characteristics, on the contrary, the undrawn fibers of Comparative Examples 1 to 4, and 7 do not satisfy such properties.

Examples 10 to 15

Preparation of Drawn PET Fibers

The drawn PET fibers of Examples 10 to 15 were prepared by drawing the undrawn fibers prepared in Examples 1 to 6 with the drawing ratio as disclosed in Table 5, and heat-treating the same at 180° C. The properties of the drawn PET fibers were measured according to the same method as in the undrawn fibers, and the results are listed in the following Table 5.

TABLE 5

| Undrawn Fibers | Examples | | | | | |
|---|---|---|---|---|---|---|
| | 10 Example 1 | 11 Example 2 | 12 Example 3 | 13 Example 4 | 14 Example 5 | 15 Example 6 |
| Drawing Ratio | 1.39 | 1.54 | 1.46 | 1.39 | 1.30 | 1.39 |
| Crystallinity (%) | 42 | 40 | 41 | 42 | 45 | 41 |
| Birefringence Index | 0.139 | 0.150 | 0.147 | 0.137 | 0.128 | 0.141 |
| AOF | 0.236 | 0.348 | 0.312 | 0.220 | 0.093 | 0.267 |
| Strength (g/d) | 6.0 | 7.0 | 6.7 | 6.3 | 6.0 | 6.4 |
| Dry Heat Shrinkage Rate (%) | 6.5 | 8.3 | 8.0 | 6.3 | 5.8 | 7.4 |
| Strength at 1% Elongation (g/d) | 0.92 | 0.82 | 0.90 | 0.98 | 1.03 | 0.93 |
| Elongation at the load of 4.5 kgf (%) | 5.5 | 5.2 | 5.4 | 5.7 | 5.9 | 5.6 |
| 010 Interplanar Spacing (Å) | 54 | 49 | 52 | 53 | 55 | 52 |
| 110 Interplanar Spacing (Å) | 44 | 42 | 43 | 44 | 45 | 44 |
| 100 Interplanar Spacing (Å) | 43 | 38 | 40 | 43 | 45 | 41 |

Comparative Examples 8 to 11

Preparation of Drawn PET Fibers

The drawn PET fibers of Comparative Examples 8 to 11 were prepared substantially according to the same method as in Examples 10 to 15, except that the undrawn fibers prepared according to Comparative Examples 1 to 4 were used. The properties of the drawn PET fibers were measured by the same method above, and the results are listed in the following Table 6.

TABLE 6

| | Comparative Examples | | | |
|---|---|---|---|---|
| | 8 | 9 | 10 | 11 |
| | Undrawn Fibers | | | |
| | Comparative Example 1 | Comparative Example 2 | Comparative Example 3 | Comparative Example 4 |
| Drawing Ratio | 1.39 | 1.8 | 1.57 | 1.50 |
| Crystallinity (%) | 38 | 35 | 36 | 37 |
| Birefringence Index | 0.163 | 0.184 | 0.180 | 0.171 |
| AOF | 0.472 | 0.651 | 0.615 | 0.541 |
| Strength (g/d) | 5.4 | 7.8 | 7.6 | 7.2 |
| Dry Heat Shrinkage Rate (%) | 9.2 | 12.5 | 11.7 | 10.2 |
| Strength at 1% Elongation (g/d) | 0.545 | 0.442 | 0.473 | 0.523 |
| Elongation at the load of 4.5 kgf (%) | 7.4 | 5.4 | 5.5 | 5.9 |
| 010 Interplanar Spacing (Å) | 48 | 44 | 46 | 47 |
| 110 Interplanar Spacing (Å) | 41 | 40 | 41 | 41 |
| 100 Interplanar Spacing (Å) | 38 | 32 | 32 | 37 |

As shown in Tables 5 and 6, it is recognized that the drawn fibers of Examples 10 to 15 prepared from the undrawn fibers of Examples 1 to 6 have high crystallinity and birefringence index, low AOF, low dry heat shrinkage rate, and high strength at 1% elongation. On the contrary, it is also recognized that the drawn PET fibers of Comparative Examples 8 to 11 prepared from the undrawn fibers of Comparative Examples 1 to 4 do not satisfy such properties.

Examples 16 to 21

Preparation of Tire Cords

The dip cords for cap ply were prepared by Z-twisting (counter-clockwise twisting) the drawn PET fibers prepared in Examples 10 to 15 with the twisting level of 430 TPM, S-twisting (clockwise twisting) the Z-twisted fibers with the twisting level of 430 TPM, dipping the same into an resorcinol/formaldehyde/latex (RFL) adhesive solution, and drying and heat-treating the same so as to prepare the tire cords. At this time, the drawn fibers of 1000 denier were twisted with the twisting level of 430 TPM.

Comparative Examples 12 to 15

Preparation of Tire Cords

The dip cords for cap ply were prepared by Z-twisting the drawn PET fibers prepared in Comparative Examples 8 to 11 with the twisting level of 430 TPM, S-twisting the Z-twisted fibers with the twisting level of 430 TPM, dipping the same into the RFL adhesive solution, and drying and heat-treating the same so as to prepare the tire cords.

The L/S values, and the LASE values at 3% elongation measured at 100° C. with the initial load of 0.05 g/d of the tire cords prepared in Examples 16 to 21 and Comparative Examples 12 to 15 are listed in the following Table 7.

TABLE 7

|  | Drawn Fibers used | L/S (g/d) | LASE at 3% Elongation (g/d) |
|---|---|---|---|
| Example 16 | Example 10 | 84 | 1.80 |
| Example 17 | Example 11 | 71 | 1.95 |
| Example 18 | Example 12 | 70 | 1.90 |
| Example 19 | Example 13 | 81 | 1.85 |
| Example 20 | Example 14 | 94 | 2.10 |
| Example 21 | Example 15 | 73 | 1.90 |
| Comparative Example 12 | Comparative Example 8 | 68 | 1.60 |
| Comparative Example 13 | Comparative Example 9 | 55 | 1.30 |
| Comparative Example 14 | Comparative Example 10 | 64 | 1.45 |
| Comparative Example 15 | Comparative Example 11 | 67 | 1.50 |

As shown in Table 7, it is recognized that the tire cords of Examples 16 to 21 those are prepared from the drawn fibers having high crystallinity and the like have the L/S values in the range of 70 to 150 g/d, and they have the LASE values in the range of 1.7 to 3.0 g/d even at 100° C. that is similar to the real operating circumstance of the tire, and thus they show superior dimensional stability and are preferable to be used to the cap ply tire cord. On the contrary, it is also recognized that the tire cords of Comparative Examples 12 to 15 do not satisfy such characteristics.

Examples 22 to 24

Preparation of Drawn PET Fibers

The drawn PET fibers of Examples 22 to 24 were prepared substantially according to the same method as in Examples 10 to 15, except that the undrawn fibers prepared in Examples 7 to 9 were drawn with the drawing ratio of 1.24, 1.24, and 1.16, respectively.

Comparative Example 16

Preparation of Drawn PET Fiber

The drawn PET fiber of Comparative Example 16 was prepared substantially according to the same method as in Comparative Examples 8 to 11, except that the undrawn fiber prepared according to Comparative Example 7 was drawn with the drawing ratio of 2.0.

The shrinkage force and the shrinkage rate were measured with regard to the drawn fibers prepared in Examples 11, 12, 14, and 22 to 24, and Comparative Examples 9 and 16, according to the following method by using the shrinkage behavior tester (Testrite Co., MK-V) illustrated in FIG. 2, and the cross-linking density was calculated from the shrinkage force and the shrinkage rate (referring to the following Mathematical Formula 1).

Shrinkage force (N): the shrinkage force was measured at the fixed temperature of 180° C. after fixing each drawn fiber with the fixed load of 0.005 g/d by using the shrinkage behavior tester. At this time, the shrinkage force was measured with regard to the drawn fiber itself, and it was measured again after heat-treating the drawn fiber at 230° C. in the taut state under the initial load of 0.02 g/d.

Shrinkage rate (%): the shrinkage rate was measured under the fixed load of 0.005 g/d while maintaining the fixed temperature of 180° C. by using the shrinkage behavior tester. At this time, the shrinkage rate was measured with regard to the drawn fiber itself, and it was measured again after heat-treating the drawn fiber at 230° C. in the taut state under the initial load of 0.02 g/d.

$$N = \sigma/kT(\lambda^2 - 1/\lambda)$$ [Mathematical Formula 1]

In the mathematical formula, N represents a number of cross-linking bond per a unit volume, namely, the cross-linking density, $\lambda$, represents an expansion ratio defined as 1/(1−shrinkage rate of the drawn PET fiber), k represents the Boltzmann constant, T represents an absolute temperature, and $\sigma$ represents a shrinkage force per a unit area of the drawn PET fiber.

The results of the shrinkage rate and the shrinkage force of the drawn fibers and the calculation result of the cross-linking density before the heat-treatment are listed in Table 8, and the results of the shrinkage rate and the shrinkage force of the drawn fibers and the calculation result of the cross-linking density after heat-treating the drawn fibers at 230° C. in the taut state under the initial load of 0.02 g/d are listed in Table 9.

TABLE 8

|  | Example 11 | Example 12 | Example 14 | Example 22 | Example 23 | Example 24 | Comparative Example 9 | Comparative Example 16 |
|---|---|---|---|---|---|---|---|---|
| Shrinkage Rate (%) | 9.00 | 7.60 | 7.50 | 7.70 | 7.80 | 7.30 | 13.80 | 11.70 |
| Shrinkage Force (N) | 5.60 | 6.29 | 6.40 | 5.92 | 6.72 | 7.02 | 3.19 | 3.90 |
| Shrinkage Force per Unit Area (N/cm$^2$) | 5040.50 | 5661.57 | 5760.58 | 5328.53 | 6048.60 | 6318.63 | 2871.29 | 3510.35 |
| Expansion Ratio ($\lambda$) | 1.0989011 | 1.08225108 | 1.0810811 | 1.0834236 | 1.0845987 | 1.0787487 | 1.1600928 | 1.1325028 |

TABLE 8-continued

| | Example 11 | Example 12 | Example 14 | Example 22 | Example 23 | Example 24 | Comparative Example 9 | Comparative Example 16 |
|---|---|---|---|---|---|---|---|---|
| Crosslinking Density (ea/cm$^3$) | 2.71E+22 | 3.66E+22 | 3.78E+22 | 3.40E+22 | 3.80E+22 | 4.27E+22 | 9.49E+21 | 1.41E+22 |

TABLE 9

| | Example 11 | Example 12 | Example 14 | Example 22 | Example 23 | Example 24 | Comparative Example 9 | Comparative Example 16 |
|---|---|---|---|---|---|---|---|---|
| Shrinkage Rate (%) | 2.80 | 2.15 | 2.10 | 2.40 | 2.00 | 2.11 | 4.85 | 5.00 |
| Shrinkage Force (N) | 2.76 | 2.76 | 2.90 | 3.10 | 2.90 | 3.13 | 3.10 | 2.70 |
| Shrinkage Force per Unit Area (N/cm$^2$) | 2484.25 | 2484.25 | 2610.26 | 2790.28 | 2610.26 | 2819.08 | 2790.28 | 2430.24 |
| Expansion Ratio (λ) | 1.0288066 | 1.0219724 | 1.0214505 | 1.0245902 | 1.0204082 | 1.0215548 | 1.0509721 | 1.0526316 |
| Crosslinking Density (ea/cm$^3$) | 4.60E+22 | 6.03E+22 | 6.49E+22 | 6.05E+22 | 6.82E+22 | 6.97E+22 | 2.92E+22 | 2.46E+22 |

Referring to Tables 8 and 9, it is recognized that the drawn PET fibers prepared from the undrawn fibers having high crystallinity and low AOF have much higher cross-linking density than the drawn fibers of Comparative Examples, and they can show the shrinkage force equal to or superior than that of Comparative Examples while having low shrinkage rate.

Examples 25 to 27

Preparation of Tire Cords

The dip cords for cap ply were prepared substantially according to the same method as in Examples 16 to 21, except that the drawn fibers prepared in Examples 22 to 24 were used.

Comparative Example 17

Preparation of Tire Cord

The dip cord for cap ply was prepared substantially according to the same method as in Comparative Examples 12 to 15, except that the drawn fiber prepared in Comparative Example 16 was used.

The properties of the tire cords of Examples 17, 18, 20, and 25 to 27, and the tire cords of Comparative Examples 13 and 17 were measured as follows, and the results are listed in Table 10.

Shrinkage force: the shrinkage force of each tire cord was measured at the temperature of 180° C. under the initial load of 0.0565 g/d for 2 minutes by using Testrite MK-V device of Testrite Co., England as illustrated in FIG. 2

LASE value at 3% (or 5%) elongation: The LASE value at 3% (or 5%) elongation (the load at 3% or 5% elongation) is measured at the room temperature by using the universal testing machine according to the testing method of ASTM D885.

TABLE 10

Properties of the tire cords

| Drawn Fibers used | Shrinkage Force (N) | LASE at 3% elongation (g/d) | LASE at 5% elongation (g/d) |
|---|---|---|---|
| Example 20 | 6.080 | 2.36 | 3.25 |
| Example 18 | 5.560 | 2.00 | 3.05 |
| Example 25 | 5.020 | 2.13 | 3.06 |
| Example 26 | 6.440 | 2.43 | 3.12 |
| Example 17 | 4.800 | 1.75 | 2.43 |
| Example 27 | 6.430 | 2.55 | 3.36 |
| Comparative Example 13 | 1.210 | 1.63 | 2.39 |
| Comparative Example 17 | 1.420 | 1.72 | 2.45 |

Referring to Table 10, it is recognized that the tire cords prepared from the drawn fibers of Examples having high cross-linking density show superior modulus property and excellent dimensional stability due to the same, because they have high LASE value at 3% elongation and 5% elongation while having superior shrinkage force than the tire cords prepared from the drawn fibers of Comparative Examples.

Therefore, it is recognized that the tire cords prepared the drawn fibers of Examples show more improved modulus property in addition to superior shrinkage force, and they are preferably applicable to the cap ply cord and the like of the pneumatic tire.

What is claimed is:

1. A drawn polyethylene terephthalate (PET) fiber including 90 mol % or more of PET, of which a crystallinity is 40% or more, a birefringence index is 0.12 to 0.16, and an amorphous orientation factor (AOF) is 0.35 or less,
   wherein the drawn PET fiber is obtained by drawing an undrawn PET fiber at a draw ratio of 0.1 to 1.55, and wherein the undrawn PET fiber has an AOF of 0.15 or less.

2. The drawn PET fiber according to claim 1, wherein the crystallinity is 40 to 50%.

3. The drawn PET fiber according to claim 1, wherein the AOF of the drawn PET fiber is 0.01 to 0.2.

4. The drawn PET fiber according to claim 1, wherein the (010) interplanar spacing of the crystal calculated from the XRD peak is 48 to 60 Å, the (110) interplanar spacing is 42 to 50 Å, and the (100) interplanar spacing is 38 to 50 Å.

5. A drawn polyethylene terephthalate (PET) fiber including 90 mol % or more of PET, of which a cross-linking density is 3.0 E+22 to 8.0 E+22 ea/cm$^3$ after heat-treating the same at 230 Å for 1 minute in a taut state under the initial load of 0.02 g/d, and an amorphous orientation factor (AOF) is 0.35 or less,
wherein the drawn PET fiber is obtained by drawing an undrawn PET fiber at a draw ratio of 0.1 to 1.55, and wherein the undrawn PET fiber has an AOF of 0.15 or less.

6. The drawn PET fiber according to claim 5, including 90 mol % or more of PET, wherein the cross-linking density is 5.0 E+22 to 8.0 E+22 ea/cm$^3$ after heat-treating the same at 230 Å for 1 minute in the taut state under the initial load of 0.02 g/d.

7. The drawn PET fiber according to claim 5, wherein the drawn fiber has the cross-linking density of 2.0 E+22 to 6.0 E+22 ea/cm$^3$ before the heat-treatment.

8. A method of preparing a drawn polyethylene terephthalate (PET) fiber, including the steps of:
melt-spinning a polymer including 90 mol % or more of PET so as to prepare an undrawn PET fiber having a crystallinity of 25% or more, and an amorphous orientation factor (AOF) of 0.15 or less; and
drawing the undrawn PET fiber with a drawing ratio of 1.0 to 1.55 so as to prepare the drawn PET fiber,
wherein the melt-spinning step is carried out with a spinning stress of 0.85 g/d or more and a spinning speed of 3800 to 5000 m/min, and
wherein the drawn PET fiber includes 90 mol % or more of PET, of which a crystallinity is 40% or more, a birefringence index is 0.12 to 0.16, and an AOF is 0.35 or less.

9. The method according to claim 8, wherein the undrawn PET fiber has a birefringence index of 0.085 to 0.11, and a melting temperature (Tm) of 258° C. or more.

10. The method according to claim 8, wherein the polymer has an intrinsic viscosity of 0.8 to 1.3 dl/g.

11. The method according to claim 8, wherein the polymer is melt-spun through spinnerets designed for making linear density of a monofilament to be 2.0 to 4.0 denier.

12. The method according to claim 11, further including the step of cooling the polymer with a cooling air of 15 to 60° C. after melt-spinning the polymer, in the step of preparing the undrawn fiber.

13. A polyethylene terephthalate (PET) tire cord, including the drawn fiber according to claim 1.

14. The PET tire cord according to claim 13, wherein the L/S value defined by the following Calculation Formula 1 is 70 g/d to 150 g/d:

$L/S=LASE/\text{Shrinkage rate}(\%)$    Calculation Formula 1 wherein, LASE is defined as Load at Specific Elongation when the elongation is 3% at 100° C.

15. The PET tire cord according to claim 13, wherein the LASE defined as the load at 3% elongation is 1.7 to 3.0 g/d when testing the tensile property with the initial load of 0.05 g/d at the temperature of 100° C.

16. The PET tire cord according to claim 13, showing the strength of 5 to 8 g/d, the Elongation (@4.5 kgf) of 1.5 to 5.0% and the elongation at break of 10 to 25%.

17. The PET tire cord according to claim 13, having total linear density of 1000 to 5000 denier, number of ply of 1 to 3, and twisting level of 200 to 500 TPM.

18. The PET tire cord according to claim 13, wherein the tire cord is a cord for cap ply.

19. A polyethylene terephthalate (PET) tire cord, including the drawn fiber according to claim 5.

20. The PET tire cord according to claim 19, wherein the L/S value defined by the following Calculation Formula 1 is 70 g/d to 150 g/d:

$L/S=LASE/\text{Shrinkage rate}(\%)$    Calculation Formula 1 wherein, LASE is defined as Load at Specific Elongation when the elongation is 3% at 100°C.

21. The PET tire cord according to claim 19, wherein the LASE defined as the load at 3% elongation is 1.7 to 3.0 g/d when testing the tensile property with the initial load of 0.05 g/d at the temperature of 100° C.

22. The PET tire cord according to claim 19, showing the strength of 5 to 8 g/d, the Elongation (@4.5 kgf) of 1.5 to 5.0% and the elongation at break of 10 to 25%.

23. The PET tire cord according to claim 19, having total linear density of 1000 to 5000 denier, number of ply of 1 to 3, and twisting level of 200 to 500 TPM.

24. The PET tire cord according to claim 19, wherein the tire cord is a cord for cap ply.

* * * * *